US011985476B2

(12) United States Patent
Kim et al.

(10) Patent No.: US 11,985,476 B2
(45) Date of Patent: May 14, 2024

(54) ELECTRONIC DEVICE INCLUDING ACOUSTIC WAVEGUIDE

(71) Applicant: Samsung Electronics Co., Ltd., Gyeonggi-do (KR)

(72) Inventors: Kiwon Kim, Gyeonggi-do (KR); Choonghyo Park, Gyeonggi-do (KR); Incheol Baek, Gyeonggi-do (KR); Jihoon Song, Gyeonggi-do (KR); Seongkwan Yang, Gyeonggi-do (KR); Sungsoo Jun, Gyeonggi-do (KR); Byounghee Lee, Gyeonggi-do (KR); Joonrae Cho, Gyeonggi-do (KR); Hochul Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/166,054

(22) Filed: Feb. 3, 2021

(65) Prior Publication Data

US 2021/0243519 A1 Aug. 5, 2021

(30) Foreign Application Priority Data

Feb. 3, 2020 (KR) ........................ 10-2020-0012542

(51) Int. Cl.
*H04R 1/28* (2006.01)
*H04M 1/03* (2006.01)
*H04R 1/34* (2006.01)

(52) U.S. Cl.
CPC .......... *H04R 1/2857* (2013.01); *H04M 1/035* (2013.01); *H04R 1/345* (2013.01); *H04R 2499/11* (2013.01)

(58) Field of Classification Search
CPC ........ H04R 1/2857; H04R 1/345; H04R 1/28; H04R 1/2823; H04R 1/2853; H04R 1/34;
(Continued)

(56) References Cited

U.S. PATENT DOCUMENTS 7,933,427 B2  4/2011  Gelbart et al.
2008/0292128 A1  11/2008  Ishii
(Continued)

FOREIGN PATENT DOCUMENTS

CN   110113453 A   8/2019
CN   111031163 A * 4/2020 ........... G10K 11/178
(Continued)

OTHER PUBLICATIONS

International Search Report dated May 10, 2021.
(Continued)

*Primary Examiner* — Ahmad F. Matar
*Assistant Examiner* — Sabrina Diaz
(74) *Attorney, Agent, or Firm* — Cha & Reiter, LLC

(57) ABSTRACT

An electronic device is disclosed, including a housing including a first surface, a second surface facing away from the first surface, and a side surface structure at least partially surrounding a space formed between the first surface and the second surface, an acoustic hole formed in the housing and configured to emit a sound in a direction the first surface faces, a speaker disposed in the housing, and a first acoustic waveguide and a second acoustic waveguide together providing an acoustic path between the speaker and the acoustic hole, wherein the second acoustic waveguide is different from the first acoustic waveguide.

14 Claims, 9 Drawing Sheets

(58) Field of Classification Search
CPC .............. H04R 3/002; H04R 2499/11; H04R 2499/15; H04M 1/035; G10K 11/18; G10K 11/00
USPC .................. 381/338, 337, 339, 345, 351
See application file for complete search history.

(56) References Cited

U.S. PATENT DOCUMENTS

| | | | |
|---|---|---|---|
| 2012/0053711 A1 | 3/2012 | Shedletsky et al. | |
| 2013/0094685 A1 | 4/2013 | Seo et al. | |
| 2016/0373566 A1* | 12/2016 | Nonaka | H04M 1/03 |
| 2017/0134545 A1* | 5/2017 | Lee | H04N 23/57 |
| 2018/0152775 A1 | 5/2018 | Zheng | |
| 2020/0404808 A1 | 12/2020 | Kim et al. | |
| 2022/0046345 A1* | 2/2022 | Mai | H04R 1/021 |

FOREIGN PATENT DOCUMENTS

| | | |
|---|---|---|
| EP | 4 018 631 A0 | 8/2021 |
| EP | 3 962 043 A1 | 3/2022 |
| KR | 10-1236057 B1 | 2/2013 |
| KR | 10-2016-0003499 A | 1/2016 |
| KR | 10-2019-0096593 A | 8/2019 |
| WO | 2021/162283 A1 | 8/2021 |

OTHER PUBLICATIONS

European Search Report dated Jun. 13, 2023.
European Examination Report dated Jan. 3, 2024.
Korean Examination Report dated Jan. 22, 2024.

* cited by examiner

ELECTRONIC DEVICE INCLUDING ACOUSTIC WAVEGUIDE

CROSS-REFERENCE TO RELATED APPLICATION(S)

This application is based on and claims priority under 35 U.S.C. 119 to Korean Patent Application No. 10-2020-0012542, filed on Feb. 3, 2020, in the Korean Intellectual Property Office, the disclosure of which is herein incorporated by reference in its entirety.

BACKGROUND

Technical Field

Various embodiments of the disclosure relate to audio output in an electronic device, and more particularly, to an electronic device with acoustic waveguides for producing audio channels within the electronic device.

Description of Related Art

The development of electronic communication technology has produced the trend of integration, in which various functionalities are all included in a single electronic device. For example, smartphones include the functionalities of a media player, imaging device, and scheduler/organizers, as well as traditional communication functionality, and furthermore may implement additional functions by having any number of applications installed thereon. The use of portable electronic devices such as smart phones is now common, and the functional integration of electronic devices is continually growing more sophisticated to meet the diverse needs of users.

SUMMARY

An electronic device such as a smart phone may include a display on its front surface, and various additional devices may be disposed around an active area ("active area" or "view area") of the display (e.g., at the top of the front surface of the electronic device). For example, a receiver for voice calls, a camera for photographing a subject, a sensor for recognizing a user's face or iris, an infrared projector as a light source for measuring depth, and various sensors, such as a proximity sensor or an illuminance sensor, and temperature sensor or atmospheric pressure sensor may be disposed at the top of the front surface of the electronic device. Such electronic devices are increasingly being utilized in entertainment fields such as multimedia and games. For example, user demands for performance of an electronic device, such as a larger memory capacity, more advanced processor performance or communication speed, and improved image or sound quality, may increase. Various sensors or input/output devices of an electronic device may be used to meet such user needs.

Various additional devices mounted on the front surface of the electronic device may provide convenience functions (e.g., functions using the camera), such as taking selfies, security functions (e.g., functions using the infrared projector or face or iris sensor), such as user identification, or operational environment functions (e.g., functions using the proximity sensor, humidity sensor, temperature/humidity or atmospheric pressure sensor), such as for optimizing the operational state. However, in the reality of designing or manufacturing the entire front surface of an electronic device as an active area of the display in order to provide improved image quality, for example, a larger screen and a high-definition image, it may be difficult for such sensors to secure a path through which various pieces of information may be received or acquired.

When the electronic device is equipped with a voice call function, the receiver may be disposed at the top of the front surface of the electronic device. An acoustic path connecting the speaker outputting sound (e.g., voice) of a received call and the receiver may be provided inside the electronic device to provide good call quality. However, it may be difficult to secure an acoustic path connected to the receiver because other additional devices are disposed inside the upper end of the electronic device, as mentioned above. For example, the voice call quality of the electronic device may deteriorate.

According to various embodiments, there may be provided an electronic device delivering good voice call quality.

According to various embodiments, there may be provided an electronic device allowing other additional devices easily arranged while providing an acoustic waveguide for delivering the sound of a received call.

In accordance with an embodiment, an electronic device includes a housing including a first surface, a second surface facing away from the first surface, and a side surface structure at least partially surrounding a space formed between the first surface and the second surface, an acoustic hole formed in the housing and configured to emit a sound in a direction the first surface faces, a speaker disposed in the housing, and a first acoustic waveguide and a second acoustic waveguide together providing an acoustic path between the speaker and the acoustic hole, wherein the second acoustic waveguide is different from the first acoustic waveguide.

In accordance with an embodiment, an electronic device includes a housing including a first surface, a second surface facing away from the first surface, and a side surface structure at least partially surrounding a space formed between the first surface and the second surface, an acoustic hole formed in the housing and configured to emit a sound in a direction the first surface faces, a speaker disposed in the housing, an electronic component disposed between the acoustic hole and the speaker inside the housing, and a first acoustic waveguide bypassing the electronic component, the first acoustic waveguide and a second acoustic wave guide providing an acoustic path between the speaker and the acoustic hole, wherein, the second acoustic waveguide is different from the first acoustic waveguide According to various embodiments, the electronic device may deliver improved sound quality in a voice call by including a plurality of acoustic waveguides between an acoustic hole provided as a receiver and a speaker outputting the sound of a received call. In one embodiment, another additional device or electronic component may obtain a path for receiving or obtaining various pieces of information from the outside of the electronic device or outputting optical signals through a space or area between the acoustic waveguides. For example, according to various embodiments, the electronic device may have other electronic components easily placed therein and may deliver enhanced call quality by providing a plurality of acoustic waveguides in a voice call.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
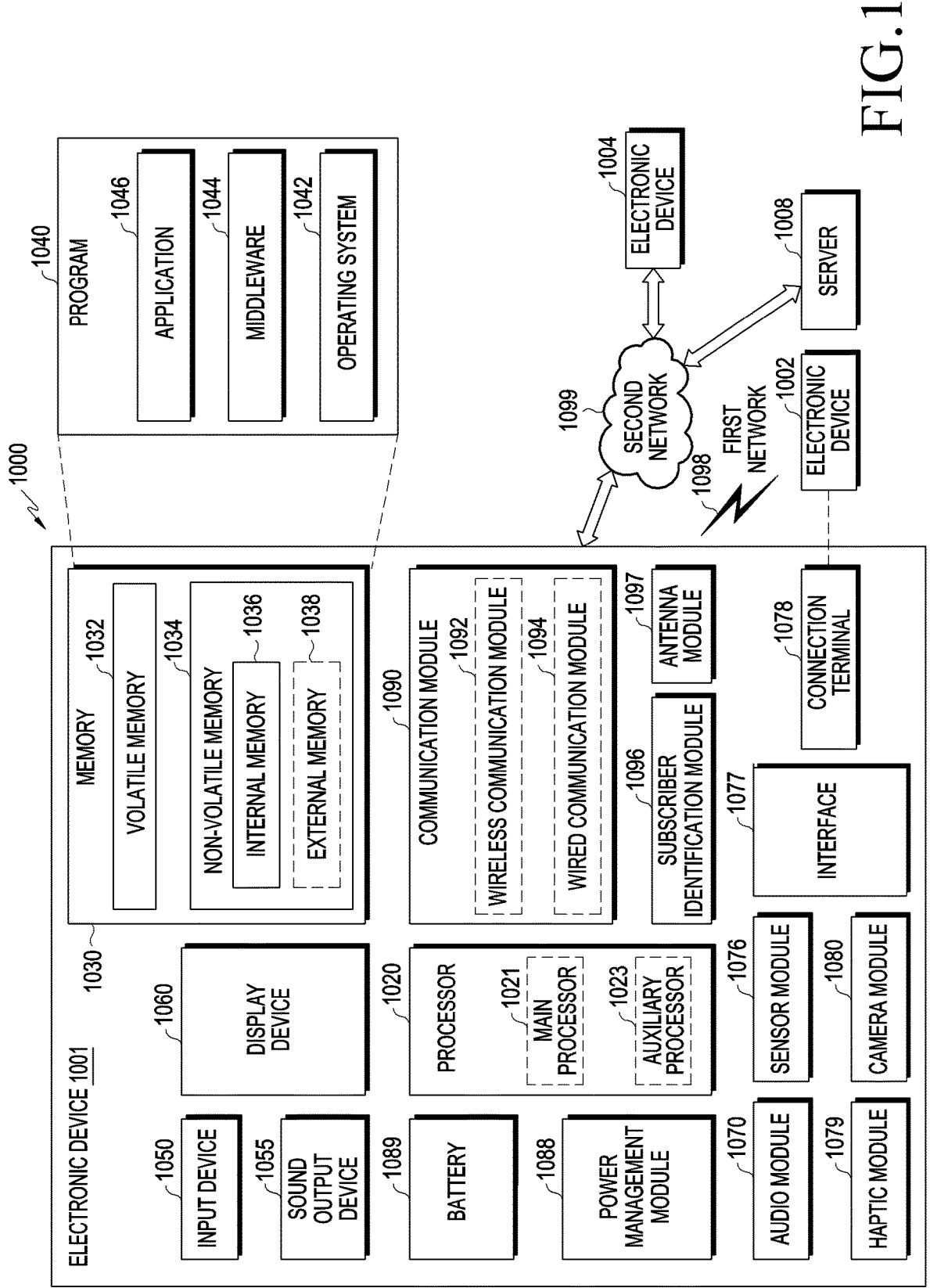
FIG. 1 is a block diagram illustrating an electronic device in a network environment according to an embodiment.

FIG. 1 is a block diagram illustrating an electronic device 1001 in a network environment 1000 according to various embodiments. Referring to FIG. 1, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020 and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state or together with the main processor 1021 while the main processor 1021 is an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050 or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
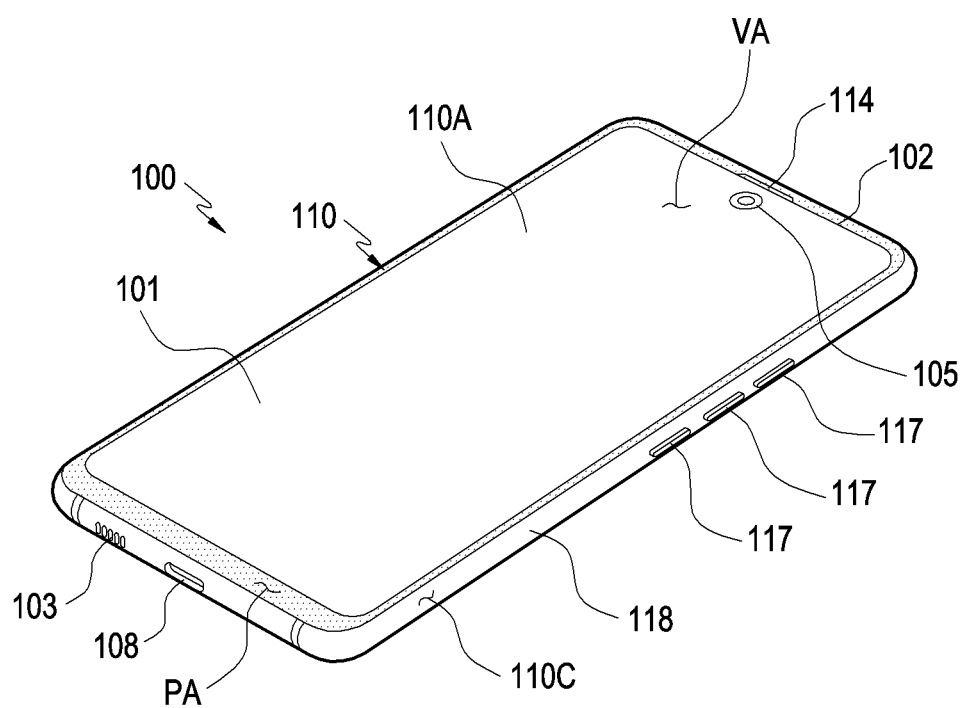
FIG. 2 is a perspective view illustrating an electronic device according to an embodiment.
Figure 3:
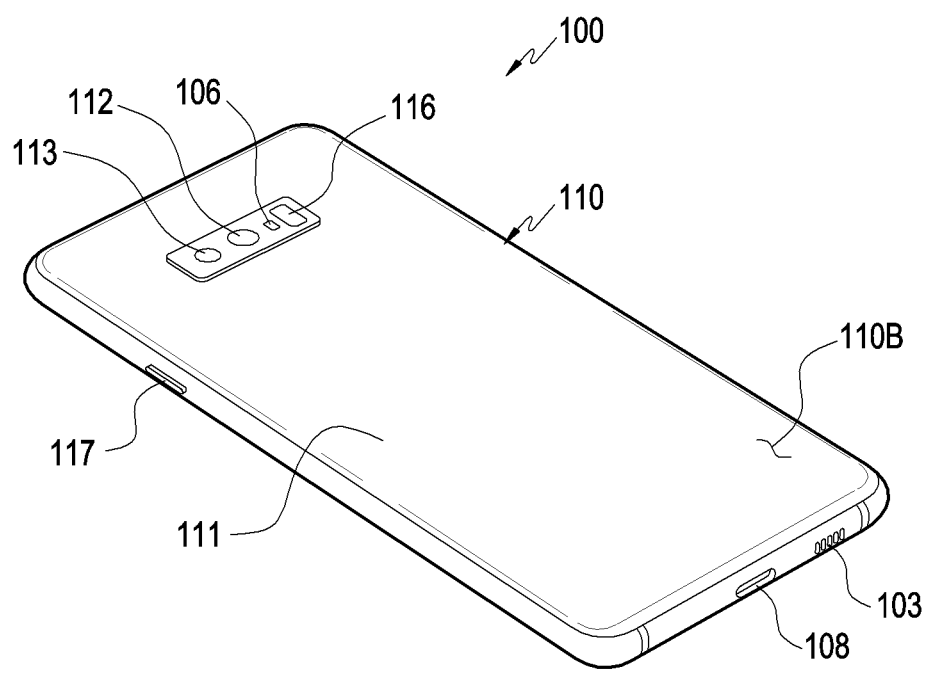
FIG. 3 is a perspective view illustrating the electronic device, as viewed from the rear.

FIG. 2 is a perspective view illustrating an electronic device 100 according to an embodiment. FIG. 3 is a perspective view illustrating the electronic device 100 of FIG. 2, as viewed from the rear.

Referring to FIGS. 2 and 3, according to an embodiment, an electronic device 100 may include a housing 110 with a first (or front) surface 110A, a second (or rear) surface 110B, and a side surface (or side wall) 110C surrounding a space between the first surface 110A and the second surface 110B. According to another embodiment (not shown), the housing 110 may denote a structure forming part of the first surface 110A, the second surface 110B, and the side surface 110C of FIG. 2.

According to an embodiment, at least part of the first surface 110A may have a substantially transparent front plate 102 (e.g., a glass plate or polymer plate including various coat layers). According to an embodiment, the front plate 102 may include a curved portion that is bent from the first surface 110A to the rear surface 111 at, at least, one side edge portion and seamlessly extends.

According to an embodiment, the second surface 110B may be formed of a substantially opaque back plate 111. The rear plate 111 may be formed of, e.g., laminated or colored glass, ceramic, polymer, metal (e.g., aluminum, stainless steel (STS), or magnesium), or a combination of at least two thereof. According to an embodiment, the rear plate 111 may include a curved portion that is bent from the second surface 110B to the front surface 102 at, at least, one side edge portion and seamlessly extends.

According to an embodiment, the side surface 110C may be formed by a side surface structure (or a "side member" or "side wall") 118 that couples to the front plate 102 and the rear plate 111 and includes a metal and/or polymer. According to an embodiment, the rear plate 111 and the side surface structure 118 may be integrally formed together and include the same material (e.g., a metal, such as aluminum).

According to an embodiment, the electronic device 100 may include at least one or more of a display 101, audio modules 103 and 114, a sensor module, an opening area 105 (e.g., the optical hole 205 of FIG. 2), a key input device 117, and a connector hole 108. According to an embodiment, the electronic device 100 may embed an optical module (e.g., the camera module, a light source, a proximity sensor, or an illuminance sensor) disposed corresponding to the opening area 105. The opening area 105 may be positioned at the top of the electronic device 100 and may be formed in a central portion of the front surface (e.g., the first surface 110A) in the width direction (e.g., the X direction in FIG. 4) or the length direction (e.g., the Y direction in FIG. 4). According to an embodiment, the opening area 105 may have a hole shape at least partially surrounded by an active area or view area (VA) of the display 101. In another embodiment, the opening area 105 may be formed in a notch area (e.g., the notch area NA of FIG. 13) formed inside the active area VA of the display 101. For example, the opening area 105 may be defined as a part of the notch area or may have a hole shape surrounded by the notch area. In another embodiment, the optical module may be disposed under the display 101 to receive light through a portion of the active area VA of the display 101 or emit light to the outside of the electronic device 100. In this case, the opening area 105 (e.g., the optical hole 205 of FIG. 2) may be omitted or may be substantially a part of the active area VA of the display 101. According to an embodiment, the electronic device 100 may exclude at least one (e.g., the key input device 117) of the components or may add other components. For example, the electronic device 100 may include a sensor module (not shown). For example, in the area provided by the front plate 102, a proximity sensor or illuminance sensor may be integrated in the display 101 or be disposed in a position adjacent to the display 101. According to an embodiment, the electronic device 100 may further include a light emitting element, and the light emitting element may be disposed in a position adjacent to the display 101 in the area provided by the front plate 102. The light emitting element may provide, e.g., information about the state of the electronic device 100 in the form of light. According to an embodiment, the light emitting element may provide a light source that interworks with the operation of an optical module (e.g., a camera module) disposed in the opening area 105. The light emitting element may include, e.g., an light emitting device (LED), an infrared (IR) LED, or a xenon lamp.

The display 101 may be visually exposed through a significant portion of the front plate 102. According to an embodiment, the edge of the display 101 may be formed to be substantially the same in shape as an adjacent outer edge of the front plate 102. According to an embodiment (not shown), the interval between the outer edge of the display 101 and the outer edge of the front plate 102 may remain substantially even to give a larger area of exposure the display 101. For example, when viewed from the top of the front plate 102, the screen display area VA of the display 101 and the peripheral area PA (e.g., a black matrix area) formed around the screen display area VA may substantially form the front surface (e.g., the first surface 110A) of the electronic device 100, and the area of the screen display area VA may be 90% or more, substantially 100%, of the area of the first surface 110A. According to an embodiment, a recess or an opening (e.g., the opening area 105) may be formed in a portion of the screen display area VA of the display 101, and other electronic components, e.g., a camera module, proximity sensor, or illuminance sensor (not shown) may be included which are aligned with the recess or the opening (e.g., the opening area 105). In another embodiment, the other electronic components aligned with the recess or opening may include at least one of an infrared projector, an iris sensor, a gesture sensor, an infrared sensor, a temperature sensor, a humidity sensor, and an atmospheric pressure sensor.

According to an embodiment, at least one or more of a camera module 112 or 113, a fingerprint sensor 116, and a flash 106 may be included on the rear surface of the screen display area VA of the display 101. According to an embodiment (not shown), the display 101 may be disposed to be coupled with, or adjacent, a touch detecting circuit, a pressure sensor capable of measuring the strength (pressure) of touches, and/or a digitizer for detecting a magnetic field-type stylus pen.

The audio modules 103 and 114 may include a microphone hole and a speaker hole. The microphone hole may have a microphone inside to obtain external sounds. According to an embodiment, there may be a plurality of microphones to be able to detect the direction of a sound. According to an embodiment, the speaker hole and the microphone hole may be implemented as a single hole, or a speaker may be included without the speaker hole (e.g., a piezo speaker). The speaker holes may include an external speaker hole and a phone receiver hole 114 (e.g., the acoustic hole 313 of FIG. 6).

The electronic device 100 may include a sensor module (not shown) and may thus produce an electrical signal or data value corresponding to the internal operation state or external environment state of the electronic device. The sensor modules may include a proximity sensor disposed on the first surface 110A of the housing 110, a fingerprint sensor integrated with, or disposed adjacent to, the display 101, and/or a biometric sensor (e.g., a heartrate monitor (HRM) sensor) disposed on the second surface 110B of the housing 110. The electronic device 100 may further include sensor modules (not shown), e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 112, 113, and 106 may include a first camera device (e.g., a camera module disposed corresponding to the opening area 105) disposed on the first surface 110A of the electronic device 100 and a second camera device 112 and 113 and a flash 106 disposed on the second surface 110B. The camera modules 112 and 113 may include one or more lenses, an image sensor, and/or an image signal processor. The flash 106 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 100.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101. According to an embodiment, the key input device may include at least a portion of the fingerprint sensor 116 disposed on the second surface 110B of the housing 110.

The connector hole 108 may receive a connector for transmitting and receiving power and/or data to/from an external electronic device and/or a connector for transmitting and receiving audio signals to/from an external electronic device. For example, the connector hole 108 may include a universal serial bus (USB) connector or an earphone jack.

Figure 4:
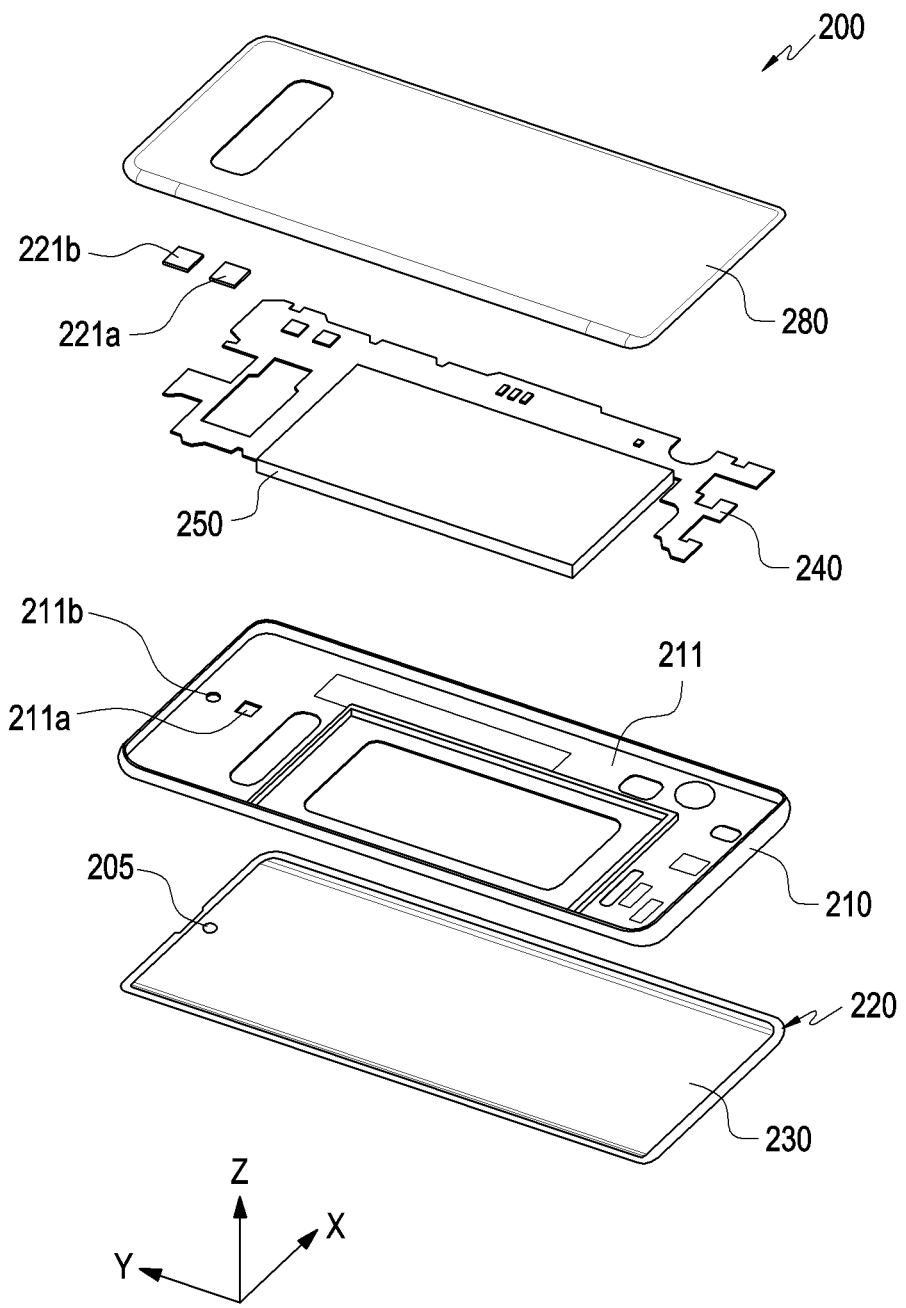
FIG. 4 is an exploded perspective view illustrating an electronic device according to an embodiment.

FIG. 4 is an exploded perspective view illustrating an electronic device 200 (e.g., the electronic device 100 of FIG. 1) according to an embodiment.

Referring to FIG. 4, an electronic device 200 may include a side surface structure 210 (e.g., the side surface structure 118 of FIG. 2), a middle plate, e.g., a member 211 (e.g., a supporting plate or bracket), a front plate 220 (e.g., the front plate 102 of FIG. 2), a display 230 (e.g., the display 101 of FIG. 1), a printed circuit board 240, a battery 250, and a rear plate 280. According to an embodiment, the display 230 may be disposed between the front plate 220 and the rear plate 280. The printed circuit board 240 in the thickness direction Z of the electronic device 200 may be disposed behind the display 230 (e.g., between the display 230 and the rear plate 280). According to an embodiment, the supporting member 211 may be disposed between the display 230 and the printed circuit board 240 to provide an electromagnetic isolation structure between the display 230 and the printed circuit board 240. According to an embodiment, the electronic device 200 may exclude at least one (e.g., the supporting member 211) of the components or may add other components. At least one of the components of the electronic device 200 may be the same or similar to at least one of the components of the electronic device 100 of FIG. 2 or 3 and no duplicate description is made below.

In one embodiment, when viewed from the top of the front plate 220, the opening area 205 (e.g., the opening area 105 of FIG. 2) formed in the display 230 may be positioned at the upper end of the electronic device 200. For example, the opening area 205 may be formed in the central portion of the electronic device 200 in the width direction X of the electronic device 200. In various embodiments, the term "opening area" may refer to an area formed by a hole passing through the display 230 (e.g., the display 101 of FIG. 2) in the screen display area VA. In some embodiments, the term "opening area" may refer to a transparent area surrounded by the screen display area VA and lacking pixels therein. For example, the opening area 205 may provide a path through which light is incident from the outside of the front plate 220 to the inside. According to an embodiment, the opening area 205 may provide a path along which light travels from the inside of the front plate 220 to the outside. In another embodiment, the "open area (e.g., the opening area 105 or 205 of FIG. 2 or 4)" may have a structure that transmits light but separates the internal space and the external space of the electronic device 100 or 200. In another embodiment, the "opening area" may have a shape of a physical or mechanical hole connecting the internal/external spaces of the electronic device 100 or 200 while transmitting light. For example, when the electronic device 100 or 200 includes a temperature sensor or a humidity sensor, information about the ambient environment of the electronic device 100 or 200 may be detected through the opening area 105 or 205.

The supporting member 211 may be disposed inside the electronic device 200 to be connected with the side surface structure 210 or integrated with the side surface structure 210. The supporting member 211 may be formed of, e.g., a metal and/or non-metallic material (e.g., polymer). The display 230 may be joined onto one surface of the supporting member 211, and the printed circuit board 240 may be joined onto the opposite surface of the supporting member 211. A processor, a memory, and/or an interface (e.g., the processor 1020, the memory 1030, and/or the interface 1077 of FIG. 1) may be mounted on the printed circuit board 240. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 200 with an external electronic device and may include a USB connector, an SD card/multimedia card (MMC) connector, or an audio connector.

The battery 250 may be a device for supplying power to at least one component of the electronic device 200. The battery 250 (e.g., 1089 of FIG. 1) may include, e.g., a primary cell which is not rechargeable, a secondary cell which is rechargeable, or a fuel cell. At least a portion of the battery 250 may be disposed on substantially the same plane as the printed circuit board 240. The battery 250 may be integrated or detachably disposed inside the electronic device 200.

According to an embodiment, the electronic device 200 may include a speaker 221a connected to a receiver (e.g., the audio module or phone receiver hole disposed with the modules 114 of FIG. 2) and an electronic component 221b disposed corresponding to the opening area 205. For example, the speaker 221a may be connected with the receiver (e.g., the acoustic hole 313 of FIG. 6) through at least one acoustic waveguide (e.g., the acoustic waveguides 415a and 415b of FIG. 6) provided inside the electronic device 200 (e.g., the housing 110 of FIG. 1), outputting sound (e.g., the voice or sound of the received call) to the outside of the electronic device 200.

The electronic component 221b received in the housing 110 may emit optical signals (e.g., infrared light) or receive or obtain optical signals from the outside through the opening area 205. For example, the electronic component 221b disposed to correspond to the opening area 205 may include at least one of an infrared projector, a gesture sensor, a proximity sensor, an illuminance sensor, a camera, an infrared sensor, and a face or iris sensor. According to an embodiment, the electronic component 221b disposed to correspond to the opening area 205 may include at least one of a temperature sensor, a humidity sensor, and an atmospheric pressure sensor. When the electronic component 221b includes at least one of a temperature sensor, a humidity sensor, and an atmospheric pressure sensor, the opening area 205 may have a through-hole structure, and the electronic component 221b may detect the external environment (e.g., temperature, humidity or atmospheric pressure) using air as a medium.

The electronic device 200 may further include at least one through-hole 211a and 211b formed in the supporting member 211. Among the through holes, the first through hole 211a may be formed to correspond to the speaker 221a. For example, the speaker 221a may be disposed at the rear of the electronic device 200, behind the supporting member 211 (e.g., between the supporting member 211 and the rear plate 280) and radiate sound to the front of the supporting member 211 through the first through hole 211a. Among the through holes, the second through hole 211b may be formed to correspond to the electronic component 221b. For example, the electronic component 221b may be disposed at the rear of the electronic device 200, behind the supporting member 211 (e.g., between the supporting member 211 and the rear plate 280), between the acoustic hole 313 and the speaker 221a, and radiate optical signals to the front of the supporting member 211, or receive or obtain various pieces of information about the external environment from the front of the supporting member 211, through the second through hole 211b.

In describing the following embodiments, the components easy to understand from the description of the electronic devices 100 and 200 according to the above-described embodiments are denoted with or without the same reference numerals and their detailed description may be skipped. In describing the following embodiments, the figures or configurations related to the above-described embodiments may be referenced for brevity of the detailed description or the drawings.

Figure 5:
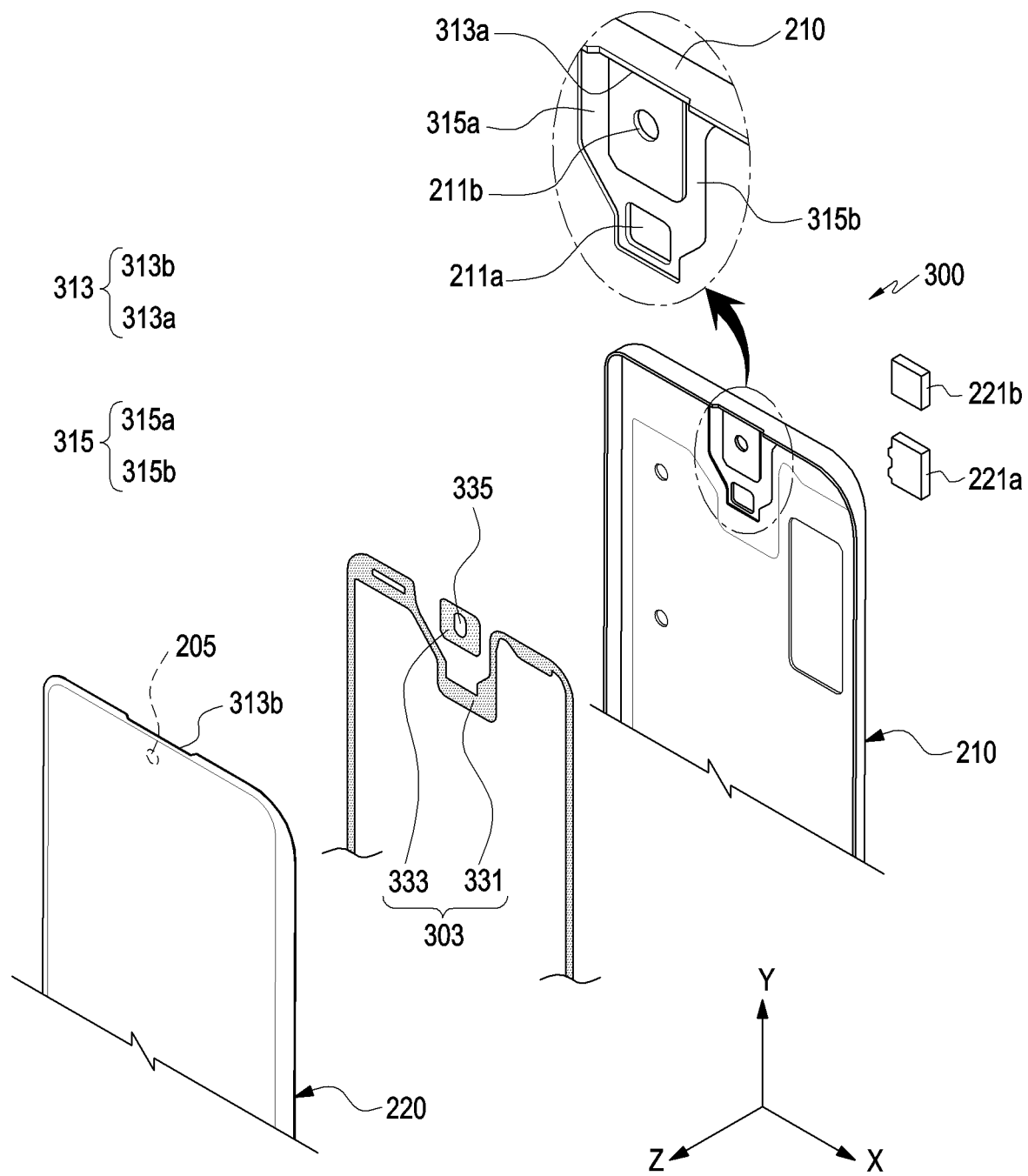
FIG. 5 is an exploded perspective view illustrating an electronic device according to an embodiment.
Figure 6:
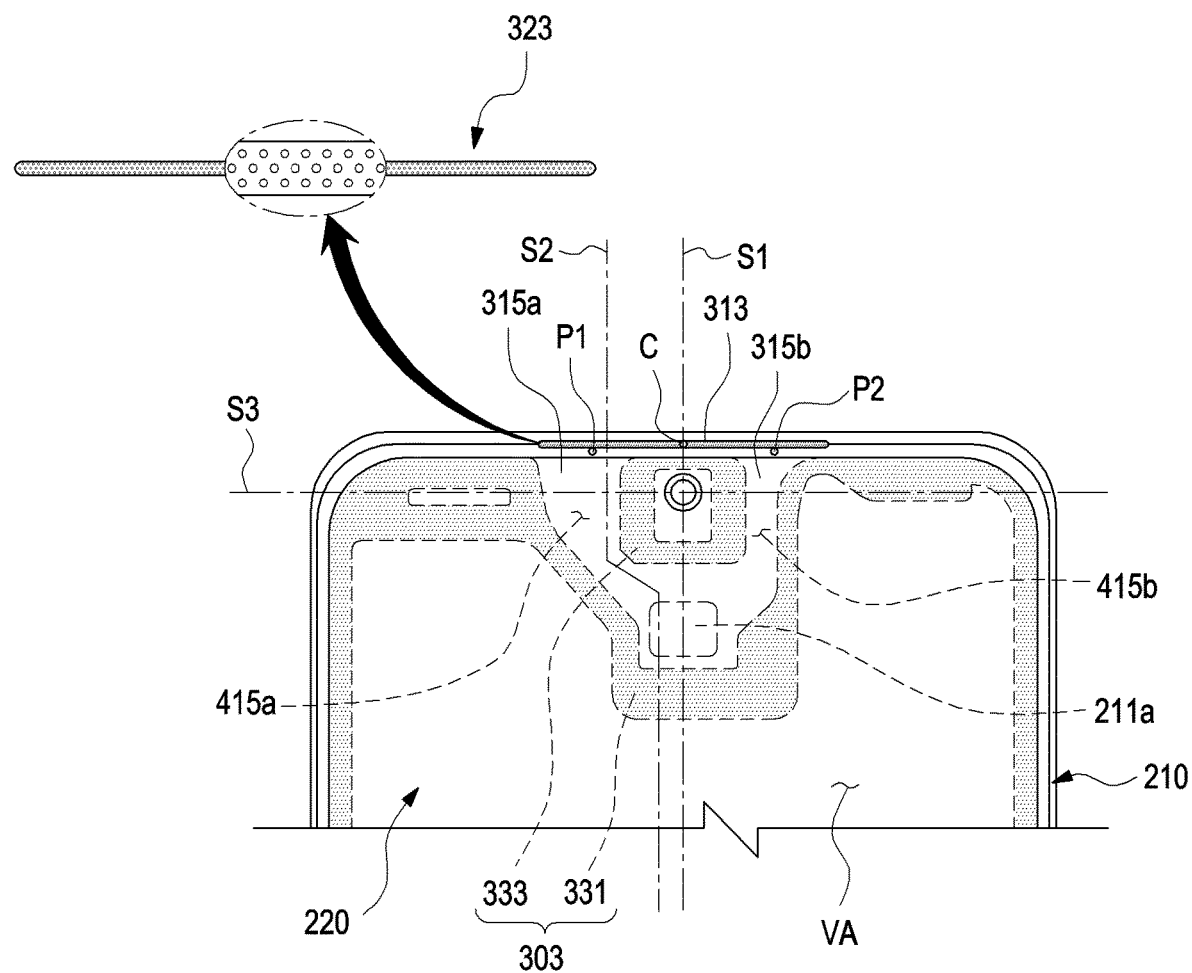
FIG. 6 is a plan view illustrating a front surface of an electronic device according to an embodiment.

FIG. 5 is an exploded perspective view illustrating an electronic device 300 (e.g., the electronic devices 1000, 100, and 200 of FIGS. 1 to 4) according to an embodiment. FIG. 6 is a plan view illustrating a front surface of an electronic device 300 according to an embodiment.

Referring to FIGS. 5 and 6, the electronic device 300 may include a plurality of acoustic waveguides 415a and 415b connecting a slit (e.g., the acoustic hole 313) and the speaker 221a. In one embodiment, the acoustic hole 313 may extend in the X direction and may be formed as a slit having a width that measures approximately 0.5 mm or less along the Y direction. The acoustic waveguides 415a and 415b may help form an acoustic propagation path from the speaker 221a to the acoustic hole 313, and may be interpreted as including the first through hole 211a according to an embodiment. In one embodiment, the first acoustic waveguide 415a is connected from the first through hole 211a to one side of the acoustic hole 313 while bypassing the second through hole 211b, and the second acoustic waveguide 415b may be connected from the first through hole 211a to the other side of the acoustic hole 313 while bypassing the second through hole 211b. For example, the sound (e.g., the voice or sound signal of a received telephone call) output from the speaker 221a may propagate through the first through hole 211a and the first acoustic waveguide 415a, or via the first through hole 211a and the second acoustic waveguide 415b, to the acoustic hole 313 and thus be radiated to the exterior environment of the device (e.g., in the direction along which the first surface 110A of FIG. 2 faces) of the electronic device 300. For example, the electronic device 300 may include a plurality of acoustic waveguides 415a and 415b, which may deliver a specific volume level (e.g., of an incoming call sound) through the acoustic hole 313 despite having a fairly small size (e.g., a width of about 0.5 mm or less).

According to an embodiment, the acoustic hole 313 may be defined at least partially by a first notch portion 313a formed on the inner wall of the side surface structure 210. For example, a portion of the inner wall of the side surface structure 210 may at least partially surround the acoustic hole 313 by including a notch structure. According to an embodiment, a portion of the acoustic hole 313 may be defined by the front plate 220 or a display (e.g., the display 230 of FIG. 4). For example, the acoustic hole 313 may be completed by the first notch portion 313a and the front plate 220 (or the display 230) as the front plate 220 is coupled to the side surface structure 210 or the supporting member 211. In one embodiment, the acoustic hole 313 may have a slit shape that extends in a width-wise direction (e.g., along the direction X of FIG. 4) or a length-wise direction (e.g., along the direction Y of FIG. 4) of the electronic device 300 (or the housing 110 of FIG. 1). Advantageously, the acoustic hole 313 as disclosed may emit an incoming call sound (e.g., a caller's voice) with a sufficient volume required for a call while substantially having little effect on the size of the electronic device 300.

According to an embodiment, the front plate 220 (or the display 230) may include a second notch portion 313b corresponding to the first notch portion 313a. For example, the acoustic hole 313 may be formed by substantially combining the first notch portion 313a and the second notch portion 313b. Although the acoustic hole 313 is completed by combining the side surface structure 210 and the front plate 220 (or the display 230) according to the instant embodiment, embodiments of the disclosure are not limited thereto. For example, in the embodiments disclosed in FIGS. 11 and 12, the acoustic hole 613 or 713 may be formed in the side surface structure 210 itself or in the front plate 220 (or the display 230) itself.

According to an embodiment, a mesh member 323 may be coupled to the acoustic hole 313. The mesh member 323 may be disposed to close a part of the acoustic hole 313, which may block foreign matter from entering the acoustic hole 313. The mesh member 323 includes a mesh structure and/or a plurality of fine or tiny holes, thereby blocking foreign matter of the exterior environment from entry into the acoustic hole 313 and interfering with sound transferred through the acoustic waveguide(s) 415a and 415b to the exterior of the electronic device 300. In this embodiment, although the acoustic hole 313 and the mesh member 323 are illustrated as separate structures, the acoustic hole 313 may be interpreted as a structure including the mesh member 323, and in another embodiment, the mesh member 323 may be omitted.

According to an embodiment, the electronic device 300 may further include a recessed portion 315 formed in the supporting member 211 (e.g., the supporting member 211 of FIG. 4). The recessed portion 315 may be formed in the supporting member 211 on a surface facing the first surface (e.g., the first surface 110A of FIG. 2), and a display (e.g., the display 230 of FIG. 4) or the front plate 220 may be coupled to the front surface of the supporting member 211 to conceal at least a portion of the recessed portion 315. For example, as the front plate 220 is coupled to the supporting member 211, the space provided by the recessed portion 315 may substantially form at least a part of the first acoustic waveguide 415a or the second acoustic waveguide 415b. For example, the recessed portion 315 may surround at least a portion of the first acoustic waveguide 415a by including a first recessed portion 315a formed on one side of the second through hole 211b, and surround at least a portion of the second acoustic waveguide 415b by including the second recessed portion 315b formed on the other side of the second through hole 211b.

According to an embodiment, the first acoustic waveguide 415a may be connected to a first portion P1 of the slit on one side of the acoustic hole 313, and the second acoustic waveguide 415b may be connected to a second portion P2 of the slit on the other side of the acoustic hole 313. In an embodiment, the first portion P1 and the second portion P2 may be positioned symmetrically about the central portion C of the slit. In an embodiment, the first acoustic waveguide 415a and the second acoustic waveguide 415b may have different shapes or sizes, and the lengths of paths through which the sound actually travels may be different. In an embodiment, the difference between the length of the acoustic path provided by the first acoustic waveguide 415a and the length of the acoustic path provided by the second acoustic waveguide 415b may be limited to about 20 mm or less. By limiting the difference in the length of the acoustic path to within a certain degree (e.g., within about 20 mm), it is possible to suppress the interference between the sound reaching the acoustic hole via the first acoustic waveguide 415a and the sound reaching the acoustic hole 313 via the second acoustic waveguide 415b.

According to an embodiment, as compared to an electronic device having a single acoustic waveguide, an electronic device having a plurality of acoustic waveguides (e.g., the first acoustic waveguide 415a and the second acoustic waveguide 415b) may deliver enhanced sound quality (e.g., sound pressure level). For example, sound quality according to the alignment of the receiver (e.g., the acoustic hole 313) and the user's body (e.g., ear or ear hole) may be improved. Table 1 below shows the results of measurement of the sound quality (e.g., sound pressure level) on different structures or when the performance of the electronic component is the same but the number of acoustic waveguides differs.

In Table 1, "one acoustic waveguide" may refer to a structure including one acoustic waveguide connected to one of the first point P1 and the second point P2 of FIG. 6, and "two acoustic waveguides" may refer to a structure including the first acoustic waveguide 415a and the second acoustic waveguide 415b as shown in FIG. 5 or 6. In Table 1, "center alignment" may refer to a state in which the point indicated by "C" in FIG. 6 (e.g., the central portion of the acoustic hole 313) is aligned with the user's body (hereinafter, a 'appropriate position'), "left alignment" may refer to a state in which the point indicated by "C" in FIG. 6 is aligned with the user's body, a few mm off the appropriate position to the left, and "right alignment" may refer to a state in which the point indicated by "C" of FIG. 6 is aligned with the user's body, several mm off the appropriate position to the right. In Table 1 below, the difference in sound pressure level between the left alignment and the right alignment results from the difference in the position where the acoustic waveguide and the acoustic hole are connected or, when a plurality of acoustic waveguides (e.g., the first acoustic waveguide 415a and the second acoustic waveguide 415b are provided, the difference between the shapes of the acoustic waveguides, and the sound level measurement may be slightly different depending on the actually manufactured product.

TABLE 1

|  | Left alignment | Center alignment | Right alignment |
| --- | --- | --- | --- |
| one acoustic waveguide | −0.85 dB | −4.40 dB | −5.56 dB |
| two acoustic waveguides | −5.31 dB | −6.78 dB | −8.23 dB |

As shown from the measurements set forth in Table 1 above, the electronic device 300 (e.g., the electronic devices 1000, 100, and 200 of FIGS. 1 to 6) according to an embodiment includes a plurality of acoustic waveguides (e.g., the first acoustic waveguide 415a and second acoustic waveguide 415b) and may thus provide an enhanced sound pressure level as compared with the electronic device including a single acoustic waveguide, regardless of alignments. In the electronic device including one acoustic waveguide, a sound pressure level deviation of about 5 dB occurs according to the alignment between the acoustic hole and the user's body but, under the same operating performance conditions, the sound pressure level deviation in the electronic device 300 according to an embodiment may be improved to about 3 dB or less.

According to an embodiment, the electronic device 300 may include an adhesive member 303 that couples the front plate 220 (or the display 230) to the supporting member 211 (or the side surface structure 210). The adhesive member 303 may include a double-sided tape, for example, a poron tape. In one embodiment, the adhesive member 303 typically attaches the edge of the front plate 220 (or the display 230) to the supporting member 211, thereby providing a waterproof structure between the front plate 220 and the supporting member 211. According to an embodiment, the adhesive member 303 may include a first adhesive member 331 and a second adhesive member 333. A portion of the first adhesive member 331 may be attached to the supporting member 211 in an area adjacent to the recessed portion 315. The second adhesive member 333 may be attached to the supporting member 211 around the second through hole 211b and may be positioned adjacent to the recessed portion 315. For example, when viewed from the front surface (e.g., the first surface 110A of FIG. 2) of the electronic device 300, the area between the first adhesive member 331 and the second adhesive member 333 may at least partially overlap substantially the first recessed portion 315a or the second recessed portion 315b. According to an embodiment, the first adhesive member 331 and the second adhesive member 333 may be provided as structures defining portions of the first acoustic waveguide 415a and the second acoustic waveguide 415b. For example, the adhesive member 303 may be positioned to surround at least a portion of the first acoustic waveguide 415a and the second acoustic waveguide 415b. The structures defining the first acoustic waveguide 415a and the second acoustic waveguide 415b are described below with further reference to FIGS. 7 to 9.

Figure 7:
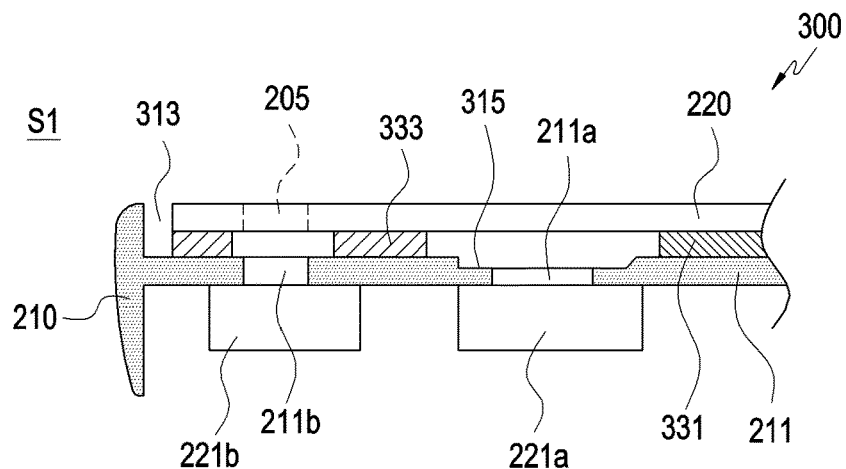
FIG. 7 is a cross-sectional view illustrating an electronic device, taken along line 51 of FIG. 6.
Figure 8:
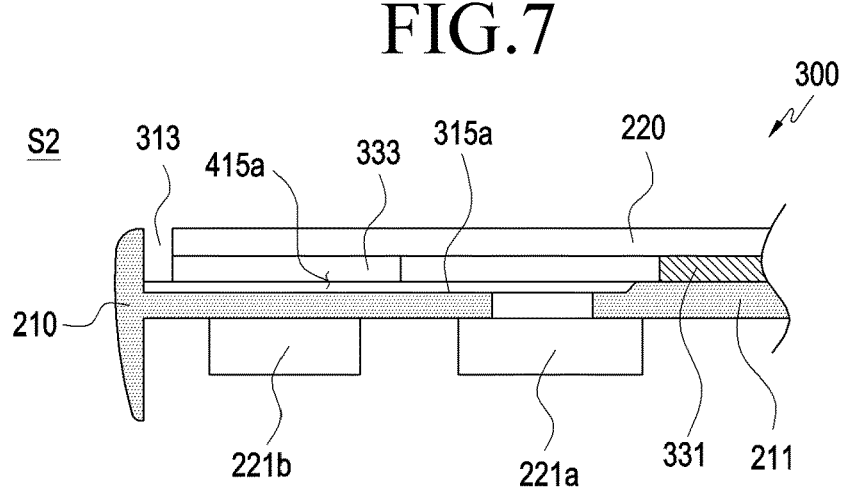
FIG. 8 is a cross-sectional view illustrating an electronic device, taken along line S2 of FIG. 6.
Figure 9:
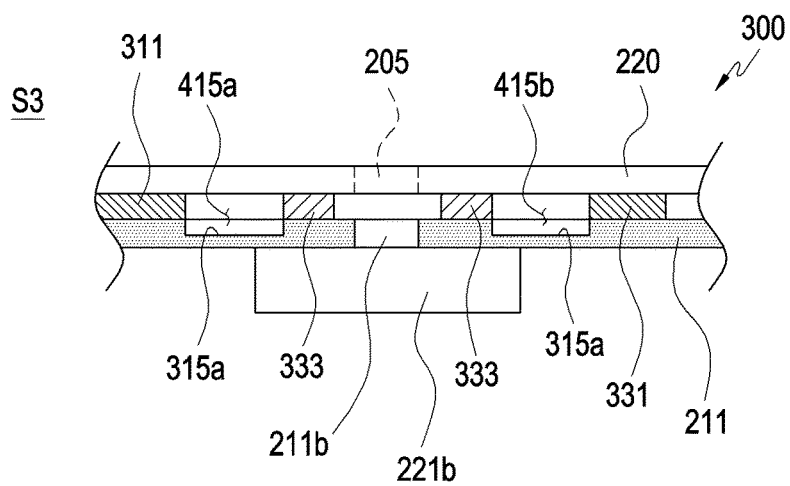
FIG. 9 is a cross-sectional view illustrating an electronic device, taken along line S3 of FIG. 6.

FIG. 7 is a cross-sectional view illustrating an electronic device 300, taken along line 51 of FIG. 6. FIG. 8 is a cross-sectional view illustrating an electronic device 300, taken along line S2 of FIG. 6. FIG. 9 is a cross-sectional view illustrating an electronic device 300, taken along line S3 of FIG. 6.

Referring to FIGS. 7 to 9, the first through hole 211a and the second through hole 211b may be substantially aligned to each other in the length direction (e.g., the Y direction of FIG. 5) of the electronic device 300. In one embodiment, the speaker 221a may be connected to the space formed by the recessed portion 315 through the first through hole 211a, and the second through hole 211b may be aligned with the opening area (e.g., the opening area 105 of FIG. 1). For example, the sound radiated from the speaker 221a may be transmitted into a space formed by the recessed portion 315 through the first through hole 211a, and the electronic component 221b may detect information pertaining to the external environment of the electronic device 300 through the second through hole 211b and/or the optical hole 205. In one embodiment, the electronic component 221b may receive or detect information regarding the external environment of the electronic device 300 through an area or space (e.g., the second through hole 211b) between the first acoustic waveguide 415a and the second acoustic waveguide 415b. In another embodiment, the electronic component 221b may include a light source such as an infrared projector, and the electronic component 221b may radiate a signal (e.g., an optical signal) to the exterior of the electronic device 300 through an area or space between the first acoustic waveguide 415a and the second acoustic waveguide 415b. According to another embodiment, the second adhesive member 333 may include another through hole 335 corresponding to the optical hole 205 or the second through hole 211b, thereby providing an environment or a path for the electronic component 221b to detect the external environment. Here, the term 'detecting the external environment' may be interpreted as including not only detecting the illuminance, but also detecting the approach of the user's body, the user's gesture, or the movement of the object or object image.

According to an embodiment, the first acoustic waveguide 415a (or second acoustic waveguide 415b) may include a bottom surface provided by the first recessed portion 315a (or second recessed portion 315b), an inner side wall the first recessed portion 315a (or the second recessed portion 315b) and the first adhesive member 331 (or the second adhesive member 333), and/or a ceiling surface provided by the front plate 220 (or the display 230). For example, the first acoustic waveguide 415a and the second acoustic waveguide 415b may be formed as the recessed portion 315 (e.g., the first recessed portion 315a and the second recessed portion 315b) of the supporting member 211, the adhesive member 303 (e.g., the first adhesive member 331 and the second adhesive member 333), and/or the front plate 220 (or the display 230) may be combined. In an embodiment, the first acoustic waveguide 415a and the second acoustic waveguide 415b may be at least partially positioned between the display 230 and the supporting member 211 and may connect the speaker 221a (or the first through hole 211a) to the slit (e.g., the acoustic hole 313) to thereby transmit the sound output from the speaker 221a to the acoustic hole 313.

According to an embodiment, when the recessed portion 315 has a certain depth, the adhesive member 303 may have a thickness sufficient to attach the front plate 220 (or display 230) to the supporting member 211. For example, the adhesive member 303 on the inner wall of the first acoustic waveguide 415a or the second acoustic waveguide 415b may be too thin to be identified with the naked eye. In this case, the inner wall of the first acoustic waveguide 415a or the second acoustic waveguide 415b may be substantially formed by the inner wall of the first recessed portion 315a or the second recessed portion 315b. In another embodiment, the adhesive member 303 may have a thickness sufficient to form the first acoustic waveguide 415a or the second acoustic waveguide 415b. When the adhesive member 303 has a sufficient thickness required to form the first acoustic waveguide 415a or the second acoustic waveguide 415b, the first recessed portion 315a or the second recessed portion 315b may be formed with a depth that is too small to be identified with the naked eye, or may be omitted entirely. In this case, the inner wall of the first acoustic waveguide 415a or the second acoustic waveguide 415b may be substantially formed by the adhesive member 303.

According to an embodiment, when viewed from the front surface (e.g., the first surface 110A of FIG. 2) of the electronic device 300, a portion of the first acoustic waveguide 415a or a portion of the second acoustic waveguide 415b may overlap the electronic component 221b. For example, as shown in FIG. 9, a portion of the first acoustic waveguide 415a or a portion of the second acoustic waveguide 415b in the depth-wise direction (e.g., the thickness or Z direction of FIG. 4) of the electronic device 300 may be positioned between the front plate 220 (or display 230) and the electronic component 221b. According to an embodiment, the first acoustic waveguide 415a and the second acoustic waveguide 415b may be formed by forming the recessed portion 315 in the supporting member 211, or by the shape of the adhesive member 303, rather than using a separate component or structure. According to an embodiment, the electronic device 300 may include a plurality of acoustic waveguides (e.g., the first acoustic waveguide 415a and the second acoustic waveguide 415b), with the shape of the supporting member 211, the front plate 220 (or display 230), and/or the supporting member 303 at least partially changed. For example, no substantial change in structure, size, or shape is made to the electronic device 300 according to an embodiment and, as described above, the electronic device 300 may provide improved acoustic performance by including a plurality of acoustic waveguides.

As described above, the electronic device 300 (e.g., the electronic devices 1000, 100, and 200 of FIGS. 1 to 4) according to an embodiment may include acoustic waveguides (e.g., the first acoustic waveguide 415a and the second acoustic waveguide 415b) bypassing the optical hole 205, or the opening area 105 for the electronic component 221b, although the electronic component 221b is disposed between the speaker 221a and the acoustic hole 313, thereby facilitating good sound quality. According to an embodiment, since the electronic device 300 includes a plurality of acoustic waveguides, the electronic device 300 may provide superior sound volume as compared with a structure having a single acoustic waveguide, despite the same speaker performance, and the electronic device 300 may mitigate the audio deviation (e.g., differences in sound level) by the alignment between the acoustic hole 313 and the user's body.

Figure 10:
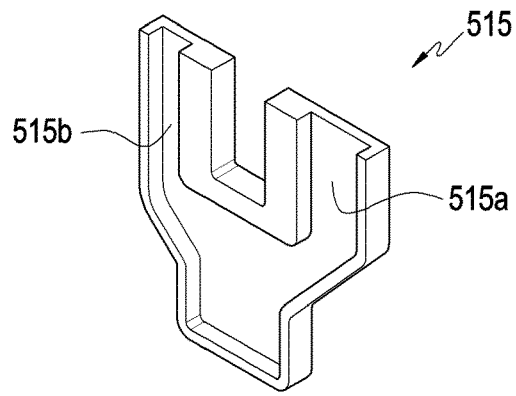
FIG. 10 is a perspective view illustrating an example duct member in an electronic device according to an embodiment.

FIG. 10 is a perspective view illustrating an example duct member 515 in an electronic device (e.g., the electronic devices 1000, 100, 200, and 300 of FIGS. 1 to 9) according to an embodiment.

Referring to FIG. 10, the electronic device (e.g., the electronic device 300 of FIGS. 5 to 9) may further include a duct member 515. The duct member 515 may generally include a third recessed portion 515a and a fourth recessed portion 515b corresponding to the recessed portion 315 (e.g., the first recessed portion 315a and the second recessed portion 315b of FIG. 5). The duct member 515 may replace part of the adhesive member 303 of FIG. 5. For example, the second adhesive member 333 may be substantially replaced by a portion of the duct member 515, and a portion of the first adhesive member 331, which is positioned adjacent to, at least, the first recessed portion 315a and the second recessed portion 315b, may be replaced by another portion of the duct member 515. For example, the duct member 515 may surround the acoustic waveguide (e.g., the first and second acoustic waveguides 415a and 415b in FIG. 6, 8 or 9) while replacing at least a portion of the adhesive member 303. In an embodiment, when the electronic device (e.g., the electronic device 300 of FIGS. 5 to 9) includes the duct member 515, the recessed portion 315 (e.g., the first recessed portion 315a and second recessed portion 315b of FIG. 5) may be omitted in forming the acoustic waveguide (e.g., the first and second acoustic waveguides 415a and 415b of FIG. 6, 8, or 9). As described above, in the electronic device 300, upon forming the acoustic waveguide (e.g., the first and second acoustic waveguides 415a and 415b of FIG. 6, 8 or 9), a separate component (e.g., the duct member 515) may be utilized or, without a separate component, a structure (e.g., the supporting member 211, the adhesive member 303, the display 230, or the front plate 220) disposed around the space or area where the acoustic waveguide is to be formed may be used.

Figure 11:
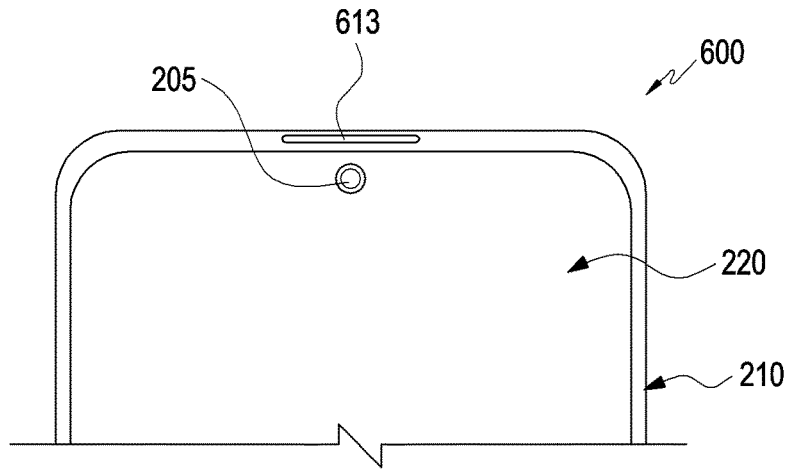
FIGS. 11, 12, and 13 are views illustrating variations to the electronic device, according to embodiments.
Figure 12:
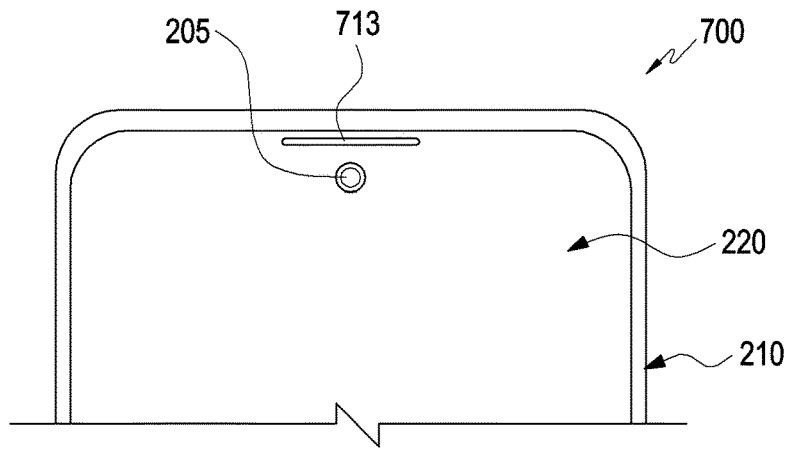
Figure 13:
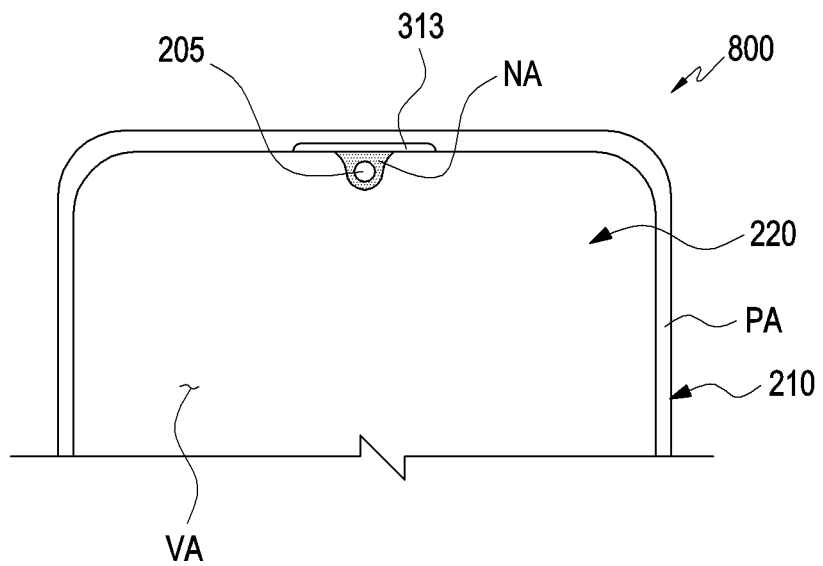

FIGS. 11 to 13 are views illustrating variations 600, 700, and 800 to, e.g., the electronic device 1000, 100, 200, or 300 of FIGS. 1 to 9, according to various embodiments.

Referring to FIG. 11, the acoustic hole 613 of the electronic device 600 may include a slit defined by the side surface structure 210. For example, the acoustic hole 613 may be formed by the shape or structure of the side surface structure 210 itself. Referring to FIG. 12, the acoustic hole 713 of the electronic device 700 may include a slit formed to pass through the front plate 220 (or the display 230 of FIG. 4). For example, the acoustic hole 713 may be formed by the shape or structure of the front plate 220 (or the display 230) itself. Depending on the position of the acoustic hole 613 or 713 or the structure having the acoustic hole 613 or 713, the structure forming the acoustic waveguides (e.g., the first acoustic waveguide 415a and the second acoustic waveguide 415b of FIG. 6, 8 or 9), for example, the recessed portion (for example, the recessed portion 315 in FIG. 5) of the supporting member 211 or the adhesive member (for example, the adhesive member 303 in FIG. 5) may be appropriately deformed.

Referring to FIG. 13, the electronic device 800 may further include a notch area NA formed inside the active area VA of the display (e.g., the display 230 of FIG. 4). For example, the notch area NA may be defined as an area substantially surrounded by the active area VA of the display and abutting the peripheral area PA (or the acoustic hole 313). According to an embodiment, when the electronic device 800 includes the notch area NA, the opening area 105 or the optical hole 205 may be located in the notch area NA.

Figure 14:
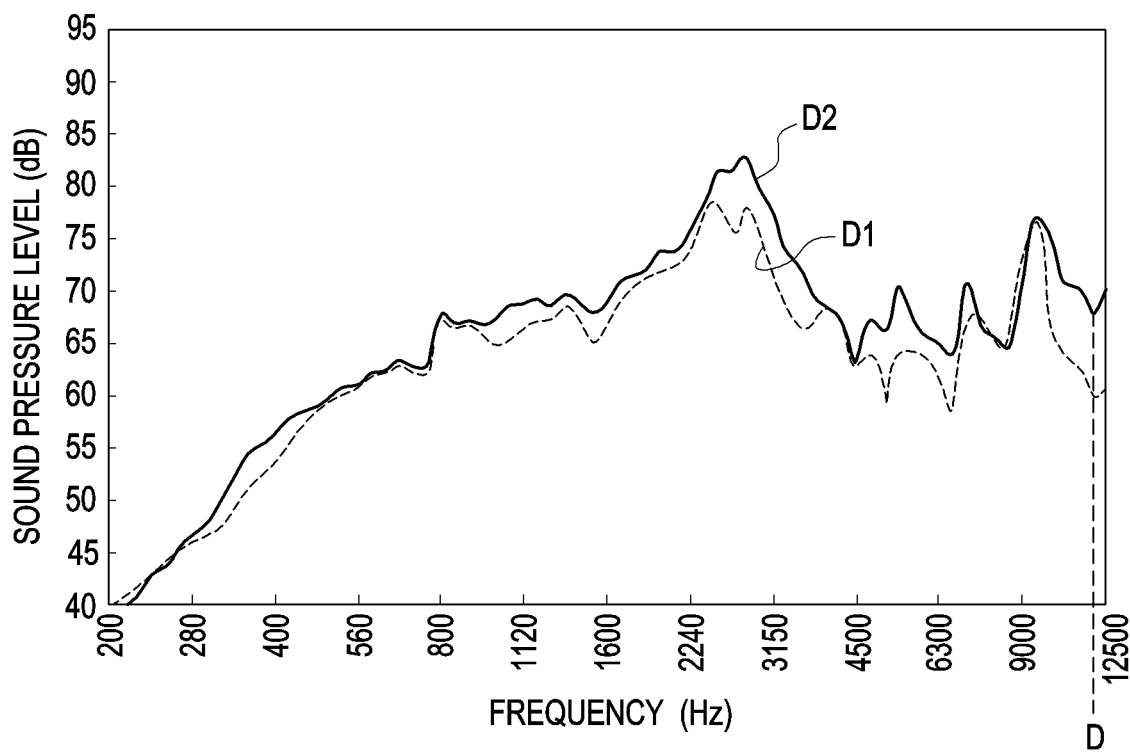
FIG. 14 is a graph illustrating acoustic characteristics of an electronic device according to an embodiment.

FIG. 14 is a graph illustrating acoustic characteristics of an electronic device (e.g., the electronic devices 1000, 100, 200, 300, 600, 700, and 800 of FIGS. 1 to 12) according to an embodiment.

FIG. 14 is a graph showing the results of measuring the sound pressure level of the electronic device in the audible frequency band (e.g., a band ranging from about 200 Hz to about 12,000 Hz), where "D1" indicates the sound pressure level of an electronic device provided with one acoustic waveguide, and "D2" indicates the sound pressure level of an electronic device (e.g., the electronic device 300 of FIG. 5 or 6) including a plurality of (e.g., two) acoustic waveguides. As shown in FIG. 14, it may be seen that an electronic device (e.g., an electronic device provided with a plurality of acoustic waveguides) according to an embodiment provides an greater sound pressure level over the entire audible frequency band compared to an electronic device provided with one acoustic waveguide. Although there are some differences depending on the frequency band, it may be identified that the sound pressure is improved by about 8 dB at about 12,000 Hz by providing a plurality of acoustic waveguides.

According to an embodiment, an electronic device (e.g., the electronic device 1000, 100, 200, 300, 600, 700, and 800 of FIGS. 1 to 13) comprises a housing (e.g., the housing 110 of FIG. 1) including a first surface (e.g., the first surface 110A of FIG. 2), a second surface (e.g., the second surface 110B of FIG. 3) facing away from the first surface, and a side surface structure (e.g., the side surface 110C of FIG. 1 or the side surface structure 210 of FIG. 4) at least partially surrounding a space between the first surface and the second surface, an acoustic hole (e.g., the acoustic hole 313 of FIGS. 5 to 9) formed in the housing and emitting a sound in a direction in which the first surface faces, a speaker (e.g., the speaker 221a of FIGS. 5 to 9) disposed in the housing, a first acoustic waveguide (e.g., the first acoustic waveguide 415a of FIG. 6, 8, or 9) providing an acoustic path between the speaker and the acoustic hole, and a second acoustic waveguide (e.g., the second acoustic waveguide 415b of FIG. 6, 8, or 9) providing an acoustic path between the speaker and the acoustic hole, the second acoustic waveguide different from the first acoustic waveguide. According to an embodiment, the electronic device may further comprise a display (e.g., the display 230 of FIG. 5) disposed between the first surface and the second surface and a supporting member (e.g., the supporting member 211 of FIGS. 5 to 9) disposed between the display and the second surface. The first acoustic waveguide and the second acoustic waveguide may be at least partially positioned between the display and the supporting member.

According to an embodiment, the electronic device may further comprise an adhesive member (e.g., the adhesive member 303 of FIGS. 5 to 9) attaching the display to the supporting member. The adhesive member may be positioned to surround at least a portion of the first acoustic waveguide and the second acoustic waveguide.

According to an embodiment, the supporting member may include a recessed portion 315 formed in a surface facing the first surface. The recessed portion may be positioned to surround at least a portion of the first acoustic waveguide and the second acoustic waveguide.

According to an embodiment, the electronic device may further comprise an electronic component (e.g., the electronic component 221b of FIGS. 5 to 9) disposed in the housing. The electronic component may be configured to receive or detect information on an external environment of the electronic device through at least a portion of an area between the first acoustic waveguide and the second acoustic waveguide.

According to an embodiment, a portion of the first acoustic waveguide or a portion of the second acoustic waveguide may be positioned between the display and the electronic component.

According to an embodiment, the electronic device may further comprise a notch area (e.g., the notch area NA of FIG. 13) formed inside an active area (e.g., the active area VA of FIG. 13) of the display, or an optical hole (e.g., the optical hole 205 of FIGS. 5 to 9) at least partially surrounded by the active area of the display. The electronic component may be disposed to correspond to the notch area or the optical hole.

According to an embodiment, the electronic component may include at least one of a camera, an infrared projector, a proximity sensor, an illuminance sensor, an iris sensor, a gesture sensor, an infrared sensor, a temperature sensor, a humidity sensor, and an atmospheric pressure sensor.

According to an embodiment, the acoustic hole may include a slit extending in a length direction (e.g., the length direction Y of FIG. 4) or a width direction (e.g., the width direction X of FIG. 4) of the housing.

According to an embodiment, the first acoustic waveguide may be connected to a first portion (e.g., the first portion P1 of FIG. 6) of the slit, and the second acoustic waveguide may be connected to a second portion (e.g., the second portion P2 of FIG. 6) of the slit. The first portion and the second portion may be positioned symmetrically around a central portion (e.g., the central portion C of FIG. 6) of the slit.

According to an embodiment, the electronic device may further comprise an electronic component disposed in the housing. The first acoustic waveguide may be connected to a first portion of the slit, and the second acoustic waveguide may be connected to a second portion of the slit. The electronic component may be configured to receive or detect information on an external environment of the electronic device through an area between the first acoustic waveguide and the second acoustic waveguide.

According to an embodiment, a portion of the first acoustic waveguide or a portion of the second acoustic waveguide may be positioned between the first surface and the electronic component.

According to an embodiment, the side surface structure may be formed to surround at least a portion of the slit.

According to an embodiment, the electronic device may further comprise a front plate (e.g., the front plate 220 of FIGS. 5 to 9) coupled to the side surface structure to form the first surface. The front plate may be formed to surround at least a portion of the slit.

According to an embodiment, the front plate may be formed to surround a portion of the slit, and the side surface structure may be formed to surround a remaining portion of the slit.

According to an embodiment, an electronic device comprises a housing including a first surface, a second surface facing away from the first surface, and a side surface structure at least partially surrounding a space between the first surface and the second surface, an acoustic hole formed in the housing and emitting a sound in a direction in which the first surface faces, a speaker disposed in the housing, an electronic component disposed between the acoustic hole and the speaker inside the housing, a first acoustic waveguide formed to bypass the electronic component and providing an acoustic path between the speaker and the acoustic hole, and a second acoustic waveguide formed to bypass the electronic component and providing an acoustic path between the speaker and the acoustic hole, the second acoustic waveguide different from the first acoustic waveguide.

According to an embodiment, the electronic component may be configured to receive or detect information on an external environment of the electronic device through an area between the first acoustic waveguide and the second acoustic waveguide.

According to an embodiment, the electronic device may further comprise a notch area formed inside an active area of the display, or an optical hole at least partially surrounded by the active area of the display. The electronic component may be disposed to correspond to the notch area or the optical hole.

According to an embodiment, the electronic device may further comprise a display disposed between the first surface and the second surface, a supporting member disposed between the display and the second surface, and an adhesive member attaching the display to the supporting member. The adhesive member may be positioned to surround at least a portion of the first acoustic waveguide and the second acoustic waveguide, between the display and the supporting member.

According to an embodiment, the electronic device may further comprise a mesh member mounted on the acoustic hole and exposed to the first surface.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. An electronic device, comprising:
a housing including a first surface, a second surface facing away from the first surface, and a side surface structure at least partially surrounding a space formed between the first surface and the second surface;
a display disposed between the first surface and the second surface;
a support member disposed between the display and the second surface and provided with a recess;
an adhesive member attaching the display to the support member while the display conceals at least a portion of the recess;
at least one acoustic hole formed in the housing and configured to emit a sound in a direction the first surface faces;
a speaker disposed in the housing; and
wherein the recess defines two acoustic paths through which sound emitted by the speaker travels to the at least one acoustic hole for emission to an external environment,
wherein the adhesive member includes:
a first adhesive member, wherein a portion of the first adhesive member is attached to the support member adjacent to a portion of the two acoustic paths; and
a second adhesive member attached to the support member between the two acoustic paths;
wherein the adhesive member surrounds the portion of the two acoustic paths, between the display and the support member, and
wherein the electronic device further comprises:
a camera component disposed in the housing, the camera component visibly exposed to an exterior environment through a notch formed in the display so as to capture images; and
a through hole formed through the second adhesive member and aligned with the camera component.

2. The electronic device of claim 1,
wherein the two acoustic paths surround at least two edges of the camera component.

3. The electronic device of claim 2, wherein the two acoustic paths surround at least two opposing edges of the camera component, such that the camera component is interposed between the two acoustic paths.

4. The electronic device of claim 2, wherein a length of a first acoustic path of the two acoustic paths is different from a length of a second acoustic path of the two acoustic paths.

5. The electronic device of claim 1, wherein a first through hole is formed on the support member, in which the speaker is disposed, and
wherein the two acoustic paths are disposed adjacent to an edge of the first through hole in which the speaker is disposed.

6. The electronic device of claim 5, wherein the two acoustic paths surround at least three edges of the first through hole in which the speaker is disposed.

7. The electronic device of claim 1, further comprising:
an electronic component separate from the display and the speaker,
wherein the portion of the two acoustic paths is disposed between positions of the electronic component and the speaker.

8. An electronic device, comprising:
a housing including a front side and a rear side;
a display configured to be viewable through the front side;
a support member disposed in the housing and configured to support the display;

an adhesive member attaching the display to the support member;
a speaker disposed between the support member and the rear side;
an acoustic hole configured to emit a sound generated by the speaker;
a first acoustic waveguide provided at least in part by a rear surface of the display and a first recess formed on the support member, providing a first acoustic path between the speaker and the acoustic hole;
a second acoustic waveguide provided at least in part by the rear surface of the display and a second recess formed on the support member, providing a second acoustic path between the speaker and the acoustic hole;
a third recess formed on the support member;
an opening corresponding to the speaker and formed through the support member in the third recess; and
an electronic component disposed between the first recess and the second recess of the support member,
wherein the first recess and the second recess extend from the third recess, respectively,
wherein the display is attached to the support member while concealing at least one of the first recess, the second recess and/or the third recess,
wherein the adhesive member is disposed along an edge of at least a portion of the first acoustic waveguide and the second acoustic waveguide, between the display and the support member,
wherein the adhesive member includes:
a first adhesive member, wherein a portion of the first adhesive member is attached to the support member adjacent to at least one of the first recess, the second recess and/or the third recess; and
a second adhesive member attached to the support member adjacent to the first recess and the second recess,
wherein the electronic device further comprises:
an optical hole at least partially surrounded by an active area of the display; and
a through hole formed through the second adhesive member and aligned with the optical hole, and
wherein the electronic component is aligned to the optical hole and is configured to receive or detect information on an external environment of the electronic device through the optical hole and the through hole.

9. The electronic device of claim 8, wherein the electronic component is configured to receive or detect information on an external environment of the electronic device through an area between the first recess and the second recess.

10. The electronic device of claim 8, further comprising a mesh member mounted on the acoustic hole and exposed to the front side.

11. The electronic device of claim 8, wherein a length of the first acoustic path is different from a length of the second acoustic path.

12. The electronic device of claim 8, wherein at least a part of the first acoustic waveguide and/or at least a part of the second acoustic waveguide is disposed in an area between the first adhesive member and the second adhesive member, respectively.

13. The electronic device of claim 8, wherein the second adhesive member is disposed in an area between the first recess and the second recess and is configured to provide at least a portion of an inner side wall of the first acoustic waveguide and/or at least a portion of an inner side wall of the second acoustic waveguide.

14. The electronic device of claim 8, wherein the through hole is disposed in an area between the first recess and the second recess.

* * * * *